US010662335B2

(12) United States Patent
Mersch et al.

(10) Patent No.: US 10,662,335 B2
(45) Date of Patent: May 26, 2020

(54) ALUMINIUMHYDROXIDE-CONTAINING COMPOSITE PIGMENTS AND METHOD FOR PRODUCTION

(71) Applicant: Kronos International, Inc., Leverkusen (DE)

(72) Inventors: Frank Mersch, Leichlingen (DE); Uwe Wilkenhoener, Wuppertal (DE)

( * ) Notice: Subject to any disclaimer, the term of this patent is extended or adjusted under 35 U.S.C. 154(b) by 185 days.

(21) Appl. No.: 15/066,430

(22) Filed: Mar. 10, 2016

(65) Prior Publication Data
US 2016/0264786 A1  Sep. 15, 2016

(30) Foreign Application Priority Data

Mar. 10, 2015 (DE) .......................... 10 2015 002 946
Apr. 17, 2015 (EP) ..................................... 15001123

(51) Int. Cl.
C09C 1/36 (2006.01)
C09C 1/40 (2006.01)
(Continued)

(52) U.S. Cl.
CPC .............. C09C 1/3653 (2013.01); C08K 9/02 (2013.01); C09C 1/3661 (2013.01); C09C 1/407 (2013.01);
(Continued)

(58) Field of Classification Search
CPC .............. C01P 2004/04; C01P 2004/62; C01P 2004/64; C09C 1/3653; C09C 1/3661; C09C 1/407; C09C 3/063; C09D 5/02
See application file for complete search history.

(56) References Cited

U.S. PATENT DOCUMENTS

| 3,409,454 | A | * | 11/1968 | Bertha | ...................... | C09C 1/36 |
| | | | | | | 106/442 |
| 3,512,926 | A | * | 5/1970 | Mercier | .................... | C01F 7/47 |
| | | | | | | 423/123 |
| 5,589,165 | A | * | 12/1996 | Yoshida | ................. | A61K 8/897 |
| | | | | | | 424/59 |
| 2001/0032570 | A1 | * | 10/2001 | Horino | ..................... | A61K 8/11 |
| | | | | | | 106/486 |

(Continued)

FOREIGN PATENT DOCUMENTS

DE       1792118 A1    7/1968
DE      10057294 C1   11/2000
(Continued)

OTHER PUBLICATIONS

GAC Chemical Corportion, Sodium Aluminate Solution Safety Data Sheet, Feb. 2015, Searsport, Maine, USA.
(Continued)

Primary Examiner — Shuangyi Abu Ali

(57) ABSTRACT

The invention relates to the manufacture of composite pigments containing aluminum hydroxide, and their use for improving the pigment light-scattering efficiency in coatings, plastics, paper and laminates. The composite pigment particles contain pigment particles such as titanium dioxide and precipitated aluminum hydroxide and are manufactured by in-situ precipitation of aluminum hydroxide in an aqueous pigment particle suspension. Use of the composite pigment particles according to the invention, based on titanium dioxide, permits savings on pigment with little or no loss of optical properties. Alternatively, if the pigment content remains unchanged, it is also possible to achieve better optical properties.

23 Claims, 2 Drawing Sheets

(51) Int. Cl.
    *C09D 5/02*     (2006.01)
    *C09C 3/06*     (2006.01)
    *C08K 9/02*     (2006.01)
    *C08K 3/013*     (2018.01)
    *C08K 3/22*     (2006.01)

(52) U.S. Cl.
    CPC .............. *C09C 3/063* (2013.01); *C09D 5/02* (2013.01); *C01P 2004/04* (2013.01); *C01P 2004/62* (2013.01); *C01P 2004/64* (2013.01); *C08K 3/013* (2018.01); *C08K 2003/2227* (2013.01); *C08K 2003/2241* (2013.01)

(56) References Cited

U.S. PATENT DOCUMENTS

2005/0228112 A1\* 10/2005 Takahashi .......... C01G 23/0532
                                                              524/497

FOREIGN PATENT DOCUMENTS

| | | |
|---|---|---|
| DE | 102006012564 A1 | 3/2006 |
| DE | 102007040641 | 3/2008 |
| EP | 0861299 B1 | 5/1997 |
| EP | 0956316 | 9/1997 |
| EP | 1329485 | 7/2003 |
| EP | 2883917 | 12/2013 |
| WO | WO99/35193 | 7/1999 |
| WO | WO00/01771 | 1/2000 |
| WO | WO2014/000874 | 1/2014 |

OTHER PUBLICATIONS

Cleartech Industries, Inc., Sodium Aluminate, Material Safety Data Sheet, Mar. 15, 2006, Saskatoon, SK, Canada.

\* cited by examiner

ALUMINIUMHYDROXIDE-CONTAINING COMPOSITE PIGMENTS AND METHOD FOR PRODUCTION

RELATED APPLICATIONS

This application claims the benefit of DE Patent App. No. DE102015002946.0 filed Mar. 10, 2015, and EP Patent App. No. EP15001123.7 filed Apr. 17, 2015.

BACKGROUND

1. Field of the Invention

The invention relates to the manufacture of composite pigments containing aluminum hydroxide, and their use for improving the pigment light-scattering efficiency in coatings, plastics, paper and laminates.

2. Technological Background of the Invention

Inorganic pigments, and particularly titanium dioxide pigments, are often incorporated into various matrices as whiteners, tinting agents or opacifiers. Owing to its high refractive index, titanium dioxide scatters light particularly efficiently and is therefore the most important white pigment for applications in paints and coatings, plastics, paper and fibers. The light-scattering efficiency declines if the titanium dioxide particles are distributed in the matrix at a distance of less than roughly half the wavelength of light from each other, i.e. roughly 0.20 to 0.25 µm. The light-scattering efficiency is typically measured with the help of the hiding power or the tinting strength of the titanium dioxide pigment in the matrix.

On the other hand, titanium dioxide is a significant cost factor, and a search has been in progress for some time to find possibilities for reducing the quantity of titanium dioxide used, without having to accept significant losses of hiding power.

Savings are possible by combining titanium dioxide particles with suitable fillers that, as so-called "extender particles", are intended to act as spacers for the $TiO_2$ particles. The known methods include both simple blending of the components and also the combination of the $TiO_2$ particles with the extender particles by means of a precipitated binder, or in-situ precipitation of the extender on the surface of the titanium dioxide particles. Furthermore known are methods for distributing the fine titanium dioxide particles on coarser extender particles.

Only selected publications from the extensive available prior art are cited below.

WO 1999/035193 A1, for example, describes the manufacture of a pigment blend consisting of titanium dioxide and an inorganic extender ("spacer"), such as $SiO_2$ or $CaCO_3$, for use in the manufacture of paper.

DE 10 057 294 C5 discloses a pigment blend consisting of titanium dioxide and talcum for use in base decor paper.

EP 0 861 299 B1 discloses a titanium dioxide pigment that is coated with inorganic nanoparticles, such as colloidal silica, and a layer consisting of inorganic oxides, such as aluminum, silicon or zirconium oxide, where the inorganic oxide layer is either located between the titanium dioxide surface and the nanoparticles, or forms the outer coating. The inorganic nanoparticles are $SiO_2$, $Al_2O_3$ or $CaCO_3$.

DE 10 2006 012 564 A1 discloses titanium dioxide pigment particles, on whose surface hollow microspheres and an aluminum oxide/aluminum phosphate coating are located.

In the method according to EP 0 956 316 B 1, pigment particles and precipitated calcium carbonate (PCC) are mixed together in an aqueous phase, so as to produce a composite pigment where the carbonate particles, with a particle size of 30 to 100 nm, are attached to the surface of the pigment particles. The composite pigment contains 30 to 90% by weight precipitated calcium carbonate.

DE 1 792 118 A1 discloses the in-situ precipitation of calcium carbonate in a titanium dioxide pigment suspension by mixing of a calcium chloride and a sodium carbonate solution, where one of these solutions contains titanium dioxide pigment. This results in composite calcium carbonate/titanium dioxide particles.

WO 2000/001771 A1 discloses a composite pigment that contains inorganic particles having a particle size of roughly 1 to 10 µm, to the surface of which titanium dioxide pigment particles are attached as a result of their opposite surface charge. Production takes place in an aqueous phase. The inorganic particles are selected from common extenders, such as kaolin, clay, talcum, mica or carbonates.

Patent application WO 2014/000874 A1 discloses a composite pigment that contains titanium dioxide and a particulate material as an extender, as well as calcium carbonate that is precipitated in the production process. The composite particles are manufactured in a combined process of dispersion and precipitation. The composite pigment is suitable for use in coatings, plastics and laminates.

Patent application EP 1 3005 813.4 (filed on Dec. 13, 2013) discloses a composite pigment that contains inorganic pigment particles, particularly titanium dioxide, and precipitated particulate calcium phosphate. The composite pigment is suitable for use in coatings, plastics, and particularly in paper and laminates.

BRIEF DESCRIPTION OF THE INVENTION

The object of the invention is to provide a method for manufacturing an alternative composite pigment.

The object is solved by a method for manufacturing composite pigment particles containing aluminum hydroxide that display an aluminum hydroxide content of at least 20% by weight, preferably at least 40% by weight, where an aqueous, alkaline solution of sodium aluminate with a pH value of at least 12 is provided, inorganic pigment particles are subsequently added, and the pH value of the solution is lowered to within the range of from greater than 3 to less than 8, such that particulate aluminum hydroxide is precipitated and composite pigment particles containing aluminum hydroxide are formed, and the composite particles are finally separated off.

Further advantageous embodiments of the invention are described in the sub-claims.

BRIEF DESCRIPTION OF THE FIGURES

For a more complete understanding of the present invention and for further advantages thereof, reference is now made to the following description taken in conjunction with the accompanying drawings in which.

DESCRIPTION OF THE PREFERRED EMBODIMENTS

Figure 1:
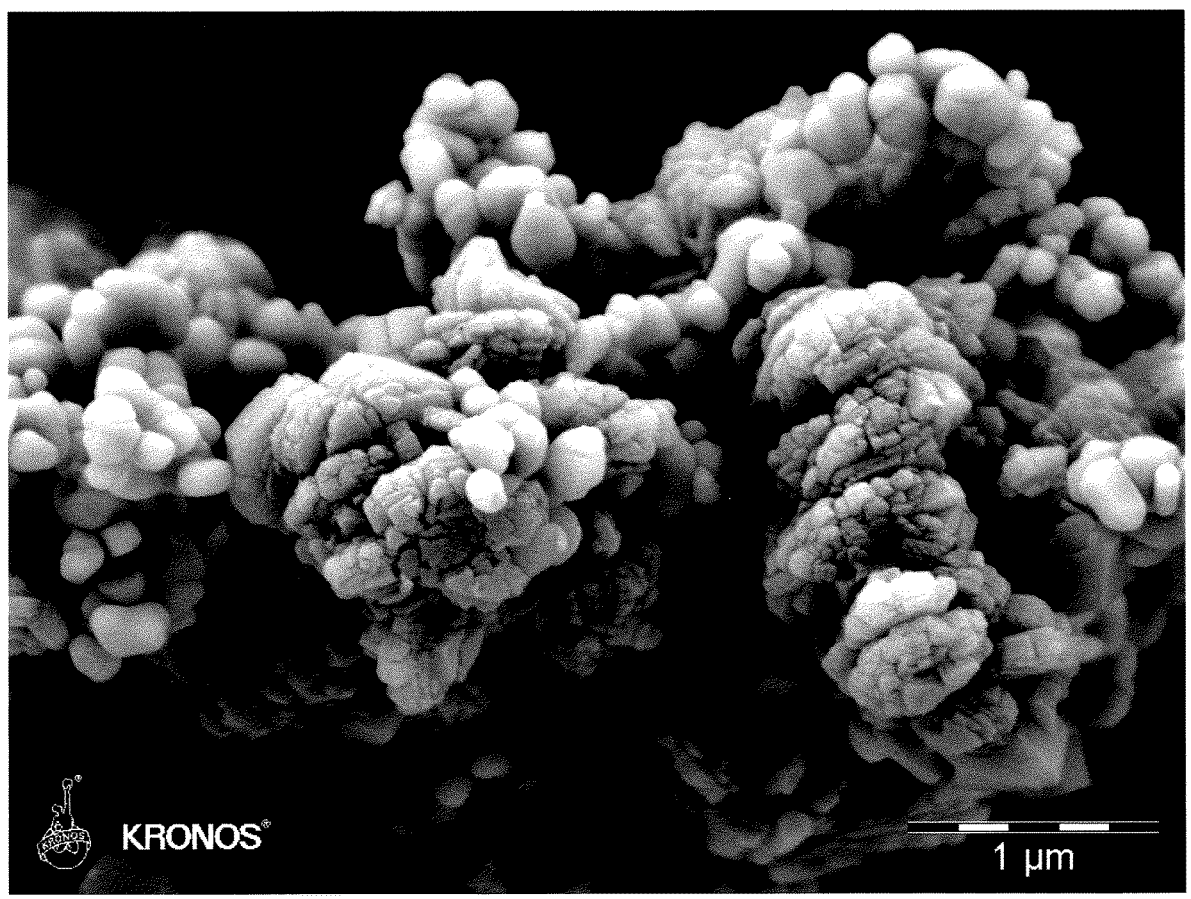
FIG. 1 is a scanning electron microscope image of composite pigment particles according to Example 1.

The present invention can be better understood by the following discussion of the manufacture and use of certain preferred embodiments. All data disclosed below regarding size in μm, etc., concentration in % by weight or % by volume, pH value, etc. are to be interpreted as also encompassing all values lying within the range of the respective measuring accuracy known to the person skilled in the art. All disclosed ranges are to be interpreted as also including all values lying within the stated range. Unless otherwise stated, technical grades of the various materials were used in the preferred embodiments.

The composite pigment particles according to the preferred embodiment of the invention contain inorganic pigment particles and in-situ precipitated aluminum hydroxide. Hereinafter, the term "aluminum hydroxide" is taken to mean aluminum orthohydroxide (e.g. gibbsite, bayerite, nordstrandite, hydrargillite) and/or aluminum metahydroxide (e.g. boehmite, diaspore). The precipitated aluminum hydroxide particles form discrete particles and/or particle agglomerates and act as carriers for the pigment particles or as spacers (extenders). The composite particles according to the preferred embodiment of the invention are moreover characterized in that a strong bond exists between the carrier or extender particle and the pigment particle, this bond being difficult to break during further, customary processing by the user, e.g. during dispersion in a dissolver or an inline disperser. This distinguishes the preferred composite pigment according to the invention from known pigment/extender blends.

In the context of the invention, the term "inorganic pigment particles" is taken to mean particles with sizes in the range from roughly 100 nm to roughly 1 μm. The pigments fundamentally open to consideration are inorganic pigments, such as titanium dioxide, iron oxide, zinc oxide, zinc sulfide, chrome pigments and sulfides.

Titanium dioxide, in particular, is suitable. Surface-treated or untreated titanium dioxide pigment particles can fundamentally be used. Untreated titanium dioxide base material particles are preferably used, particularly titanium dioxide base material particles from the chloride process. The titanium dioxide pigment particles can be doped, preferably with aluminum. It is particularly advantageous in economic terms to use non-sand-milled, non-dechlorinated titanium dioxide base material particles manufactured by the chloride process. Alternatively, it is also possible to use sand-milled, dechlorinated titanium dioxide base material particles from the chloride process, or sand-milled titanium dioxide base material particles from the sulfate process.

The aluminum hydroxide particles are preferably predominantly crystalline, and more preferably crystalline. In a special embodiment, they display a particle size of at least 0.05 μm, preferably at least 0.5 μm, and more preferably at least 1.0 μm. The particles are both primary particles and particle agglomerates.

The preferred composite particles according to the invention contain at least 20% by weight aluminum hydroxide, preferably at least 40% by weight. The pigment content of the composite particles is preferably from 20 to 80% by weight.

In a special embodiment of the invention, the composite pigment additionally contains at least one further inorganic extender and/or at least one organic extender. The inorganic extender can be selected from the group comprising natural and synthetic silicates (e.g. talcum, kaolin, mica, mullite, quartz, silica gels, precipitated silica, fumed silica, silicon dioxide, surface-treated silicon dioxide), carbonates (e.g. natural or precipitated calcium or magnesium carbonate, dolomite), sulfates (e.g. natural or precipitated calcium and barium sulfate), oxides/hydroxides (e.g. aluminum oxide, aluminum hydroxide, magnesium oxide), natural minerals, such as basalt and pumice dust, perlites and further extenders known to the person skilled in the art (e.g. wollastonite, feldspars, mica, fibrous extenders, glass dust, etc.). Particularly preferred are dolomite, huntite, magnesite and hydromagnesite.

The further extender preferably displays a particle size of roughly 0.1 to 30 μm, more preferably roughly 1 to 10 μm. The further extender can be contained in quantities of 10 to 60% by weight, preferably 20 to 50% by weight.

The preferred composite pigment particles according to the invention contain the pigment in ideally dispersed form and thus lead to an increase in the light-scattering efficiency of the inorganic pigment, particularly of titanium dioxide pigment, in the user's system. This makes it possible to save that portion of the pigment that is usually not ideally dispersed in the user's system, but present in "flocculated" form. The composite pigment particles lead to improved hiding power in the user's system if the quantity of pigment remains unchanged, or they permit reduction of the pigment content in the user's system while retaining an unchanged hiding power.

The preferred composite pigment particles according to the invention are manufactured by in-situ precipitation of aluminum hydroxide in an aqueous pigment particle suspension.

The preferred method according to the invention for manufacturing composite pigment particles containing aluminum hydroxide that display an aluminum hydroxide content of at least 20% by weight, preferably at least 40% by weight, is based on an alkaline sodium aluminate solution with a pH value of at least 12. If necessary, the pH value is preferably set with sodium hydroxide solution.

In a special embodiment of the invention, the sodium aluminate solution is an industrial residue, e.g. from the aluminum processing industry. Sodium aluminate solutions from the aluminum processing industry customarily display a concentration of roughly 200 g/l. If this residue contains coloring impurities and the aim is to precipitate pure-white aluminum hydroxide, it is advantageous to largely remove the coloring impurities by pre-precipitation. Pre-precipitation is initiated by lowering the pH value. Experience shows that a small proportion of the dissolved substances is precipitated at room temperature (up to roughly 30° C.) and a pH value of roughly 12. The solubility product is dependent both on the pH value and on the temperature and pressure. The pH value changes accordingly for precipitation at other temperatures.

The pH value is preferably lowered by adding hydrochloric acid or an acid aluminum compound (e.g. aluminum sulfate). A slightly colored precipitate and a clear, colorless supernatant (sodium aluminate) are formed after a dwell time of roughly 1 to 8 hours.

According to the preferred embodiment of the invention, the aluminum content of the solution is subsequently set to roughly 250 g/l to 400 g/l, e.g. by adding a corresponding quantity of sodium aluminate.

According to the preferred embodiment of the invention, the inorganic pigment particles are subsequently added to the sodium aluminate solution. In the context of the invention, the term "inorganic pigment particles" is taken to mean particles with sizes in the range from roughly 100 nm to roughly 1 μm. The pigments fundamentally open to consideration are inorganic pigments, such as titanium dioxide, iron oxide, zinc oxide, zinc sulfide, chrome pigments and sulfides. Titanium dioxide, in particular, is suitable. The titanium dioxide pigment particles can be surface-treated or untreated. They can, for example, be titanium dioxide base material from the sulfate process or the chloride process. Milled or unmilled titanium dioxide base material particles manufactured by the chloride process are suitable, in particular. Likewise suitable are sand-milled titanium dioxide base material particles from the sulfate process.

The pH value of the solution is subsequently lowered to within the range that is greater than 3 but less than 8, preferably to a pH value of from 6 to less than 8, and the aluminum hydroxide precipitated. Precipitation can be initiated by adding an acid component, such as an acid (e.g. hydrochloric acid) or by adding an acid-reacting salt (e.g. aluminum sulfate). In a special embodiment of the method, acid, non-dechlorinated titanium dioxide base material particles can be used.

In a special embodiment of the method, aluminum hydroxide nuclei are additionally used, particularly in quantities of 0.1 to 1.0% by weight.

The precipitation reaction can be performed in a static or dynamic mixer, or in an agitated vessel or a thoroughly agitated reactor of conventional design.

The precipitated aluminum hydroxide is particulate and preferably predominantly crystalline, and more preferably crystalline. The particles are both primary particles and particle agglomerates. The person skilled in the art is aware that the particle size of the precipitated aluminum hydrate can be controlled by varying the precipitation conditions, such as temperature, pH value profile and addition rate, and by adding precipitation-promoting substances, such as crystal nuclei, magnesium ions or organic substances. In a special embodiment, the particles display a particle size of at least 0.05 µm, preferably at least 0.5 µm, and particularly at least 1.0 µm.

In a preferred embodiment of the invention, lowering of the pH value is followed by an ageing period, exceeding the corresponding rest periods observed during the customary coating of (titanium dioxide) pigment particles (e.g. 30 minutes). According to the invention, the ageing period is preferably at least 1 hour, preferably at least 2 hours. The ageing period permits the development of the crystalline structure of the aluminum hydroxide particles.

The quantities are adjusted in such a way that the composite pigment particles formed contain at least 20% by weight aluminum hydroxide, particularly at least 40% by weight.

The TiO2 content of the composite pigment particles is preferably from 20 to 80% by weight.

In a special embodiment of the invention, at least one further inorganic extender and/or at least one organic extender is added to the suspension. The inorganic extender can be selected from the group comprising natural and synthetic silicates (e.g. talcum, kaolin, mica, mullite, quartz, silica gels, precipitated silica, fumed silica, silicon dioxide, surface-treated silicon dioxide), carbonates (e.g. natural or precipitated calcium or magnesium carbonate, dolomite), sulfates (e.g. natural or precipitated calcium and barium sulfate), oxides/hydroxides (e.g. aluminum oxide, aluminum hydroxide, magnesium oxide), natural minerals, such as basalt and pumice dust, perlites and further extenders known to the person skilled in the art (e.g. wollastonite, feldspars, mica, fibrous extenders, glass dust, etc.). Particularly preferred are dolomite, huntite, magnesite and hydromagnesite.

The further extender preferably displays a particle size of roughly 0.1 to 30 µm, particularly roughly 1 to 10 µm. The further extender can be added in quantities of 10 to 60% by weight, preferably 20 to 50% by weight, referred to composite pigment particles.

Finally, the composite pigment particles are separated from the suspension, washed and dried.

The effectiveness of the pigment, particularly of the titanium dioxide, can be optimized, depending on the required quality of the product manufactured with the composite pigment particles (coating, plastic, laminate, etc.). Savings on pigment, achieved due to its more effective use in the composite pigment particle, result in an economic advantage, compared to the separate use of extender and pigment. Use of the composite pigment particles manufactured according to the invention in the user's system permits pigment savings of up to 30%, preferably 15 to 30%, while the optical properties remaining unchanged.

In particular, the composite pigment can be used to partially or completely replace the pure pigment (e.g. titanium dioxide).

A further advantage lies in the fact that the $TiO_2$ present on the composite pigment particle is already well-dispersed, meaning that energy can be saved during dispersion in a paint system, for example. The composite pigment particles are coarser, compared to the pure pigment, and need less energy for dispersion and milling, as well as smaller quantities of dispersant. This yields a further advantage for the paint manufacturer.

In a further embodiment of the method according to the invention, the composite pigment particles according to the invention can be treated with inorganic compounds, such as $SiO_2$, $Al_2O_3$ or phosphate, of the kind customarily used in the production of titanium dioxide pigments. The person skilled in the art is familiar with the corresponding compounds and procedures.

In a special embodiment of the method according to the invention, organic additives can additionally be added, preferably in quantities of 0.05 to 30% by weight, preferably 0.5 to 10% by weight, referred to pigment/extender blend. The organic additives can be added in both solid and liquid form. Suitable as organic additives are, on the one hand, commercially available, wax-like additives with or without further chemical functionalization. Also suitable, on the other hand, are familiar dispersants or other auxiliaries customary in paint technology, e.g. for rheology, defoaming, wetting, etc.

The composite pigment particles according to the invention are suitable for use in coatings, plastics, paper and laminates.

EXAMPLES

The invention is described in more detail on the basis of the following examples, although this is not to be taken as a limitation of the scope of the invention.

Example 1

250 g $Al_2O_3$ in the form of an aqueous sodium aluminate solution (concentration 295 g/l) were added to an aqueous suspension of 250 g untreated titanium dioxide pigment particles (base material) in 500 ml water with a pH value of approx. 10, stirring intensively. The pH value rose to between 12 and 13 in the process. Aluminum hydroxide precipitation was subsequently performed by lowering the pH value by gradually adding 25% HCl over a period of 8 hours. A pH value of 6 to 8 was reached by the end. This was followed by ageing for several hours. The solid was subsequently washed with demineralized water in a Buchner funnel, separated off and dried in the laboratory oven at 105° C. for 16 hours.

Figure 2:
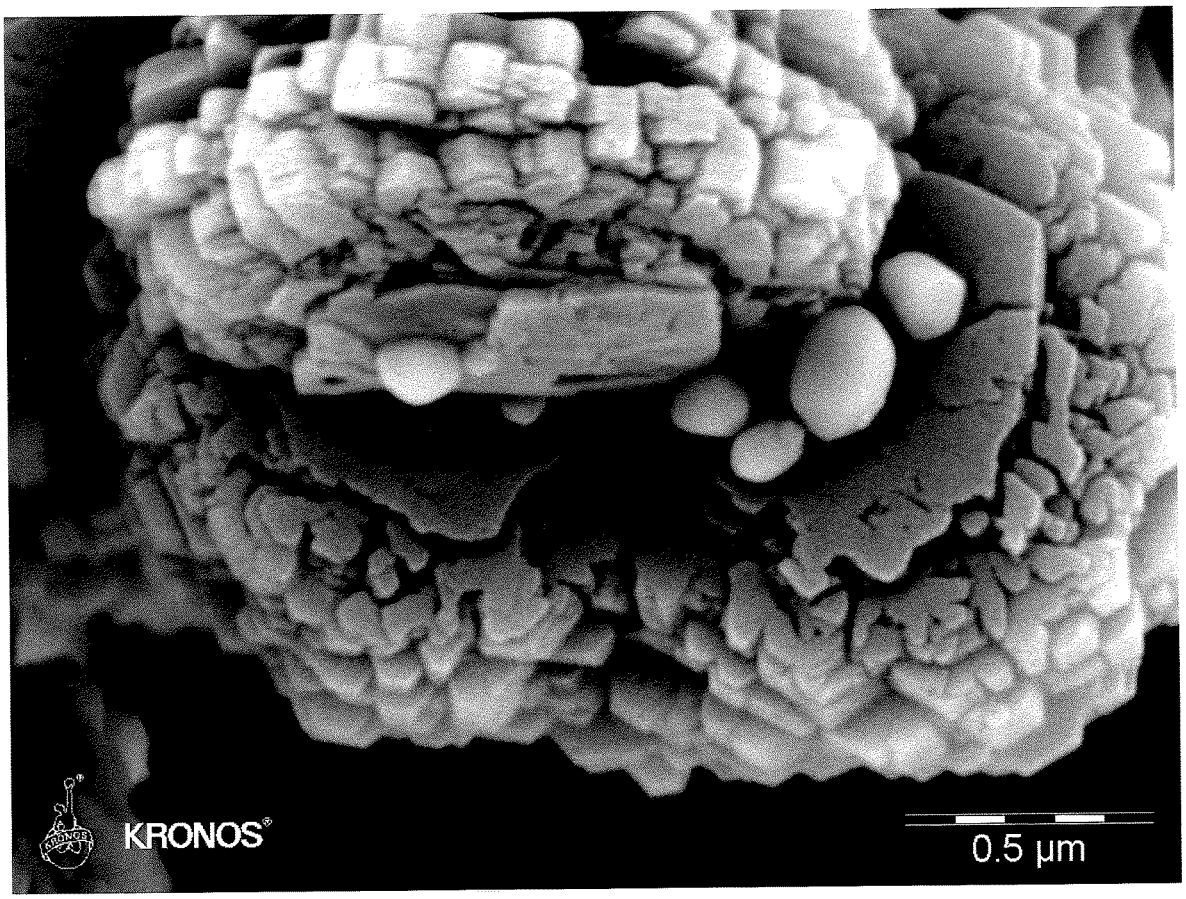
FIG. 2 is a scanning electron microscope image of composite pigment particles according to Example 1 at a higher magnification than FIG. 1.

The composite particles manufactured contained 50% by weight titanium dioxide and 50% by weight aluminum hydroxide. The composite particles were examined under the scanning electron microscope (FIGS. 1, 2). They essentially comprise large aluminum hydroxide crystals and crystal agglomerates, to the surface of which titanium dioxide particles are attached.

The composite pigment particles were subsequently incorporated into an interior emulsion paint (test paint) having the formulation given in Table 1, where the $TiO_2$ pigment KRONOS 2310 was partly replaced by the composite pigment particles according to Example 1, such that the net $TiO_2$ pigment content was reduced by 10% by weight (Example 1-1), 20% by weight (Example 1-2) and 30% by weight (Example 1-3), referred to $TiO_2$ pigment in each case. The pigment volume concentration (PVC) of the test paint was 78%.

As Reference Example 1, the test paint was prepared only with the commercial $TiO_2$ pigment KRONOS 2076 (universal pigment with little post-treatment), and as Reference Example 2, the test paint was prepared only with the commercial $TiO_2$ pigment KRONOS 2310 (high-end pigment, optimized for paint applications), without composite pigment particles in each case.

TABLE 1

| Formulation of the white interior emulsion paint (test paint) | |
| --- | --- |
| Water | 17.75% by weight |
| Calgon N neu (dispersant) | 0.05% by weight |
| Dispex N 40 (dispersant) | 0.30% by weight |
| Agitan 315 (defoamer) | 0.20% by weight |
| Acticid MBS (algicide/fungicide) | 0.40% by weight |
| $TiO_2$ pigment (KRONOS 2310) | 22.00% by weight |
| Steamat (extender) | 7.00% by weight |
| Socal $P_2$ (extender) | 2.00% by weight |
| Omyacarb 2-GU (extender) | 11.80% by weight |
| Omyacarb 5-GU (extender) | 15.50% by weight |
| Celite 281 SS (extender) | 2.00% by weight |
| Tylose paste (3%) | 10.00% by weight |
| Mowilith LDM 1871 (binder) | 11.00% by weight |

The test paint was tested for its contrast ratio (CR) and tinting strength (TS). The test results are compiled in Table 2.

TABLE 2

| | White interior emulsion paint | | |
| --- | --- | --- | --- |
| | Contrast ratio (CR) (mean 80-125 μm) | Tinting strength (TS) (standardized) | Net $TiO_2$ pigment content [% by weight] |
| Example 1-1 | 96.9 | 103 | 19.8 |
| Example 1-2 | 96.8 | 101 | 18.7 |
| Example 1-3 | 96.7 | 98 | 17.6 |
| Reference Example 1 | 95.5 | 94 | 22.0 |
| Reference Example 2 | 96.7 | 100 | 22.0 |

Test Methods

To determine the contrast ratio, the white interior emulsion paint (test paint) produced in accordance with the specified formulation was applied to Morest charts with grooved doctor blades (80-125 μm) by means of an automatic film applicator at a speed of 12.5 mm/s. The Y over black background (Y(black)) and Y over white background (Y(white)) color values were then measured three times each with the color-view spectrophotometer. The contrast ratio was calculated according to the following formula:

$$CR[\%] = Y(\text{black})/Y(\text{white}) \times 100$$

To determine the tinting strength (TS), 50 g of the test paint produced in accordance with the specified formulation were mixed with 0.5 g Colanyl Schwarz PR 130 black paste and applied to Morest charts with a doctor blade (groove depth 100 μm). The reflectance values of the film were measured with a Byk-Gardner color-view. The TS values derived therefrom are referred to Reference Example 2 as the standard.

The use of composite pigment particles according to the invention, consisting of aluminum hydroxide and titanium dioxide pigment, e.g. in paints, permits savings on pigment with little or no loss of optical properties, depending on the combination selected. Alternatively, if the pigment content remains unchanged, it is also possible to achieve better values, particularly for the tinting strength.

What is claimed is:

1. A method for manufacturing composite pigment particles comprising the steps of:
   providing an aqueous, alkaline solution of sodium aluminate, having a pH of at least 12;
   adding substantially spherical inorganic titanium dioxide pigment particles to the alkaline solution;
   lowering the pH of the solution to a pH in the range of from greater than 3 to less than 8, such that particulate aluminum hydroxide is precipitated and composite pigment particles containing the titanium dioxide pigment particles and particulate aluminum hydroxide carrier are formed;
   wherein the particulate aluminum hydroxide carrier displays particle sizes of at least 0.5 μm;
   wherein the titanium dioxide pigment particles are present on the surface of the aluminum hydroxide carrier particles;
   separating the composite pigment particles from the solution;
   wherein the composite pigment particles have an aluminum hydroxide content of at least 20% by weight.

2. The method of claim 1, wherein the composite pigment particles have an aluminum hydroxide content of at least 40% by weight.

3. The method of claim 1, wherein the aqueous, alkaline solution of sodium aluminate is at least partially an industrial residue.

4. The method of claim 1, further comprising adding at least one further inorganic or organic solid to the solution prior to lowering the pH.

5. The method of claim 1, further comprising the step of treating the composite pigment particles with a solution selected from the group consisting of phosphoric acid, sodium silicate, aluminum salt and mixtures thereof.

6. The method of claim 1, further comprising the step of aging the solution for a period of at least 1 hour after lowering its pH.

7. The method of claim 6, wherein the aging period is at least 2 hours.

8. The method of claim 1 wherein the particulate aluminum hydroxide is predominately crystalline.

9. The method of claim 1, wherein the displayed particle sizes are at least 1.0 μm.

10. The method of claim 1, wherein the step of lowering the pH of the solution is to a pH that is the range of from 6 to less than 8.

11. The method of claim 1, further comprising the step of using the composite pigment particles to form product selected from the group consisting of coatings, plastics, papers and laminates.

12. The method of claim 1, wherein the particulate aluminum hydroxide displays particle sizes of at least 1.0 µm.

13. The method of claim 12, wherein the composite pigment particles have an aluminum hydroxide content of at least 40% by weight.

14. The method of claim 12, wherein the aqueous, alkaline solution of sodium aluminate is at least partially an industrial residue.

15. The method of claim 12, further comprising adding at least one further inorganic or organic solid to the solution prior to lowering the pH.

16. The method of claim 12, further comprising the step of treating the composite pigment particles with a solution selected from the group consisting of phosphoric acid, sodium silicate, aluminum salt and mixtures thereof.

17. The method of claim 12, further comprising aging the solution for a period of at least 1 hour after lowering its pH.

18. The method of claim 17, wherein the aging period is at least 2 hours.

19. The method of claim 12, wherein the particulate aluminum hydroxide is predominately crystalline.

20. The method of claim 12, wherein the step of lowering the pH of the solution is to a pH that is in the range of from 6 to less than 8.

21. The method of claim 12, further comprising the step of using the composite pigment particles to form product selected from the group consisting of coatings, plastics, papers and laminates.

22. The method of claim 1 wherein the titanium dioxide pigment particles have a particle size of from about 0.1 to about 1 µm.

23. The method of claim 12 wherein the titanium dioxide pigment particles have a particle size of from about 0.1 to about 1 µm.

* * * * *